United States Patent
Dial (10) Patent No.: US 12,007,019 B2
(45) Date of Patent: Jun. 11, 2024

(54) MODIFIED VEHICLE TRANSMISSION HYDRAULIC VALVE CIRCUIT FOR FORWARD SPRAG PROTECTION

(71) Applicant: Sonnax Transmission Company, Bellows Falls, VT (US)

(72) Inventor: James A. Dial, Springfield, MO (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 18/339,634

(22) Filed: Jun. 22, 2023

(65) Prior Publication Data

US 2024/0026970 A1    Jan. 25, 2024

Related U.S. Application Data

(60) Provisional application No. 63/354,515, filed on Jun. 22, 2022.

(51) Int. Cl.
*F16H 61/02* (2006.01)
*F16H 61/00* (2006.01)

(52) U.S. Cl.
CPC ..... *F16H 61/0276* (2013.01); *F16H 61/0009* (2013.01); *F16H 61/0267* (2013.01); *F16H 2061/0062* (2013.01); *F16H 2061/0279* (2013.01)

(58) Field of Classification Search
CPC ............. F16H 61/0267; F16H 61/0276; F16H 61/0009; F16H 2061/0279; F16H 2061/0062; F16H 2061/0065
See application file for complete search history.

(56) References Cited

U.S. PATENT DOCUMENTS

| | | | | |
|---|---|---|---|---|
| 6,840,361 | B1* | 1/2005 | Jackson | F16H 61/14 192/3.3 |
| 2016/0252178 | A1* | 9/2016 | Dial | F16H 61/0267 137/15.17 |
| 2017/0219091 | A1* | 8/2017 | Dial | F16H 61/30 |
| 2020/0361448 | A1* | 11/2020 | Moorman | F16H 61/12 |

* cited by examiner

*Primary Examiner* — Edwin A Young
(74) *Attorney, Agent, or Firm* — Andrus Intellectual Property Law, LLP (57) ABSTRACT

A modified hydraulic circuit for an OEM vehicle transmission, which transmission has a forward clutch, a forward clutch hub and a forward sprag having an inner sprag race and an outer sprag race, an overrun clutch and an overrun clutch hub, the forward clutch and the forward sprag providing a link to a planetary gear train to propel the vehicle forward, the forward clutch hub defining the outer sprag race, the overrun clutch hub defining the inner sprag race, a hydraulic valve body having a plurality of passages and a separator plate, and a 1-2 shift valve, a 2-3 shift valve, a 3-4 shift valve and a 3-4 relay valve, and a gear shift valve, includes a blockage in the passage fluidically connecting the 2-3 shift valve to the overrun clutch, a blockage in the passage fluidically connecting the gear shift valve to the 2-3 shift valve, removal of a movable element from the first check valve body and a passage from the gear shift valve to the overrun clutch via the first check valve body, wherein when operating in the D4 mode, the forward clutch is applied and the overrun clutch is applied and are locked to one another, such that the forward sprag clutch is ineffective. A method of modifying the hydraulic circuit is disclosed.

15 Claims, 8 Drawing Sheets

PRIOR ART

MODIFIED VEHICLE TRANSMISSION HYDRAULIC VALVE CIRCUIT FOR FORWARD SPRAG PROTECTION

BACKGROUND

Many vehicles have engines that are modified to increase power and torque. Specifically, engines are modified to increase power and torque delivered to the driven wheels. Such modifications, however, increase the stresses on other components of the drivetrain.

For example, the forward sprag on original equipment manufacturer (OEM) 4L60/65/70 E transmissions 10 has exhibited failure issues in vehicles with increased horsepower and torque. When the vehicle is driven in the drive or D4 position, the forward clutch and forward sprag provide the link to the planetary gear train to propel the vehicle forward.

Figure 1:
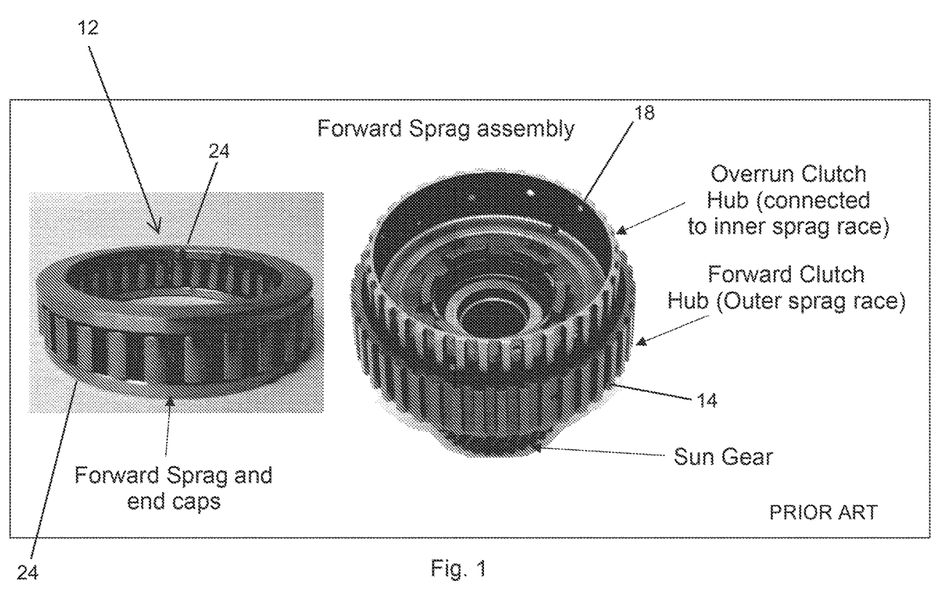
FIG. 1 is an illustration of a forward sprag assembly.
Figure 2:
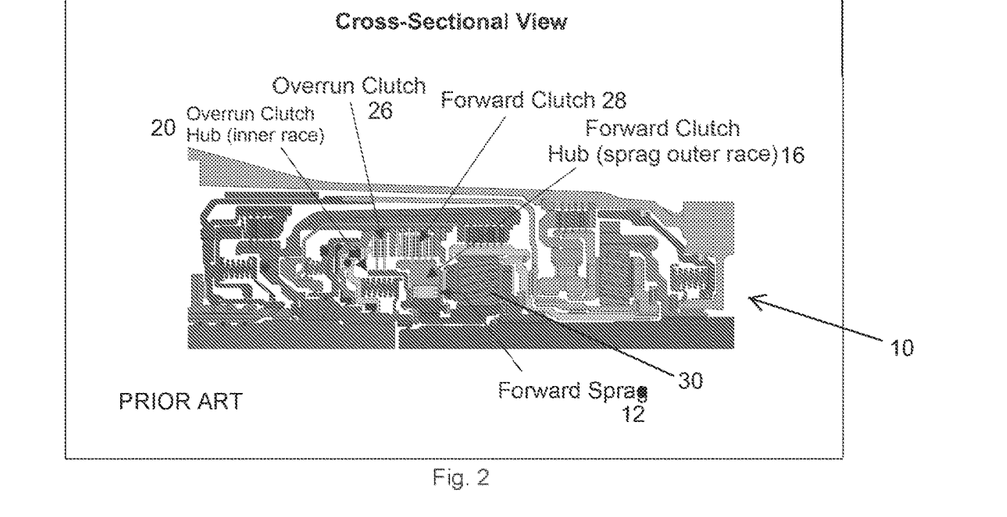
FIG. 2 is a schematic cross-sectional illustration of one-half of an original equipment manufacturer (OEM) vehicle transmission.

Referring to FIGS. 1 and 2, the forward sprag assembly 12 includes the forward clutch hub 14, which is the outer sprag race 16, the overrun clutch hub 18, which connects to the inner sprag race 20, the inner race 20 and the sprag assembly 12 and end caps 24.

The increased power transmitted through the transmission 10 has been shown to increase the stresses on the forward sprag 12 that can result in failure of the sprag 12.

Accordingly, there is a need for a modification to the transmission hydraulic circuit to reduce the stresses on the forward sprag. Desirably, such a modification takes the load off of the forward sprag and applies the overrun clutch in the D4 position, but the forward sprag is ineffective as the forward and overrun clutches are engaged or locked together by their clutches.

SUMMARY

In one aspect, a modified hydraulic circuit for an OEM vehicle transmission is disclosed. The transmission has a forward clutch, a forward clutch hub and a forward sprag having an inner sprag race and an outer sprag race. The transmission further includes an overrun clutch and an overrun clutch hub. The forward clutch and the forward sprag provide a link to a planetary gear train to propel the vehicle forward. The forward clutch hub defines the outer sprag race and the overrun clutch hub defines the inner sprag race.

The OEM vehicle transmission, when operating in a D4 mode, applies the forward clutch but does not apply the overrun clutch.

The OEM vehicle transmission further includes a hydraulic valve body having a plurality of passages and a separator plate. The hydraulic circuit further includes a 1-2 shift valve, a 2-3 shift valve, a 3-4 shift valve and a 3-4 relay valve, and a gear shift valve. One of the plurality of passages fluidically connects the 2-3 shift valve to the overrun clutch via a first check valve. The first check valve has a body and a movable element ball. The movable ball element can be a check valve ball. Another of the passages fluidically connects the gear shift valve to the 2-3 shift valve.

In an embodiment, the modified hydraulic circuit includes a first blockage in the passage fluidically connecting the 2-3 shift valve to the overrun clutch, a second blockage in the passage fluidically connecting the gear shift valve to the 2-3 shift valve, and removal of the movable element from the first check valve body. The modified hydraulic circuit further includes a passage from the gear shift valve to the overrun clutch via the first check valve body.

In such an embodiment, when operating in the D4 mode, the forward clutch is applied and the overrun clutch is applied and are locked to one another, such that the forward sprag is ineffective.

In embodiments, the first and/or second blockages is a plug in the separator plate. The first and second blockages can be a plug in the valve body. In embodiments, removal of the movable element is removal of the check valve ball.

In embodiments, the modified hydraulic circuit can include a replacement separator plate. In such a replacement separator plate, the first and second blockages are formed by a replacement separator plate that is devoid of openings at locations that otherwise fluidically connect the 2-3 shift valve to the overrun clutch and fluidically connect the gear shift valve to the 2-3 shift valve. In embodiments, the passage from the gear shift valve to the first check valve body is an opening in the valve body.

In another aspect, a method of modifying a hydraulic circuit for an OEM vehicle transmission is disclosed. The transmission has a forward clutch, a forward clutch hub and a forward sprag having an inner sprag race and an outer sprag race. The transmission further includes an overrun clutch and an overrun clutch hub. The forward clutch and the forward sprag provide a link to a planetary gear train to propel the vehicle forward. The forward clutch hub defines the outer sprag race and the overrun clutch hub defines the inner sprag race.

The OEM vehicle transmission, when operating in a D4 mode, applies the forward clutch but does not apply the overrun clutch.

The OEM vehicle transmission further includes a hydraulic valve body having a plurality of passages and a separator plate, and further includes a 1-2 shift valve, a 2-3 shift valve, a 3-4 shift valve and a 3-4 relay valve, and a gear shift valve.

In the OEM transmission hydraulic circuit, one of the plurality of passages fluidically connects the 2-3 shift valve to the overrun clutch via a first check valve. The first check valve has a body and a movable element ball, such as a check valve ball. Another of the passages fluidically connects the gear shift valve to the 2-3 shift valve.

In one aspect, the method includes blocking the passage fluidically connecting the 2-3 shift valve to the overrun clutch, blocking the passage fluidically connecting the gear shift valve to the 2-3 shift valve, and removing the movable element, such as the check valve ball, from the first check valve body. The method further includes forming a passage from the gear shift valve to the overrun clutch via the first check valve body, In such a method, when operating in the D4 mode, the forward clutch is applied and the overrun clutch is applied and are locked to one another, such that the forward sprag is ineffective.

In a method, blocking the passage fluidically connecting the 2-3 shift valve to the overrun clutch is installing a plug in the separator plate. The method can also include blocking the passage fluidically connecting the gear shift valve to the 2-3 shift valve by installing a plug in the separator plate. Methods can further include blocking the passage fluidically connecting the 2-3 shift valve to the overrun clutch by installing a plug in the valve body, and can further include blocking the passage fluidically connecting the gear shift valve to the 2-3 shift valve by installing a plug in the valve body.

Methods can still further include blocking the passage fluidically connecting the gear shift valve to the 2-3 shift valve by installing a plug in the separator plate.

Methods can yet further include installing a replacement separator plate, in which the first and second blockages are formed by a replacement separator plate that is devoid of openings at locations that otherwise fluidically connect the 2-3 shift valve to the overrun clutch and fluidically connect the gear shift valve to the 2-3 shift valve. Forming the passage from the gear shift valve to the first check valve body can be accomplished by forming an opening in the valve body.

Further understanding of the present disclosure can be obtained by reference to the following detailed description in conjunction with the associated drawings, which are described briefly below.

DESCRIPTION OF THE FIGURES

Embodiments of a modified vehicle transmission hydraulic circuit for forward sprag protection methods of making the modification are disclosed as an example and are not limited by the figures of the accompanying drawings, in which like references may indicate similar elements and in which:

FIGS. 3a and 3b are charts illustrating the various transmission components that are actuated or in use in various transmission gears, in which FIG. 3a illustrates the OEM transmission components actuated or in use in various transmission gears, and in which

DETAILED DESCRIPTION

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Referring first to FIG. 1, there is shown a schematic cross-sectional illustration of one-half of an original equipment manufacturer (OEM) vehicle transmission 10. The illustrated transmission 10 is a General Motor original equipment manufacturer (OEM) 4L60E transmission 10. The transmission 10 includes a forward clutch 26, a forward clutch hub 14 and the forward sprag 12 having the inner sprag race 20 and the outer sprag race 16. The transmission 10 further includes an overrun clutch 26 and the overrun clutch hub 18. The forward clutch 28 and the forward sprag 12 provide a link to a planetary gear train 30 to propel the vehicle forward. The forward clutch hub 14 defines the outer sprag race 16 and the overrun clutch hub 18 defines the inner sprag race 20.

The OEM vehicle transmission 10 further includes a hydraulic valve body 36 having a plurality of passages 38 (described in more detail below) and a separator plate 40. The valve body 36 further includes a 1-2 shift valve 42, a 2-3 shift valve 44, a 3-4 shift valve 46, a 3-4 relay valve 48, and a gear shift valve 50. One of the passages 38a fluidically connects the 2-3 shift valve 44 to the overrun clutch 26 via a first check valve 52. The first check valve 52 has a body 54 and a movable element 56. The movable element 56 can be for example, a check ball. Another of the passages 38b fluidically connects the gear shift valve 50 to the 2-3 shift valve 44.

In certain transmissions, such as the illustrated OEM 4L60E transmission the overrun clutch 26 with the forward clutch 28 is applied in the D3, 2 and 1 manual positions. However, most people do not select these positions; rather, they place the selector (operably connected to the gear shift valve 50) in the D4 position and drive.

Figure 3A:
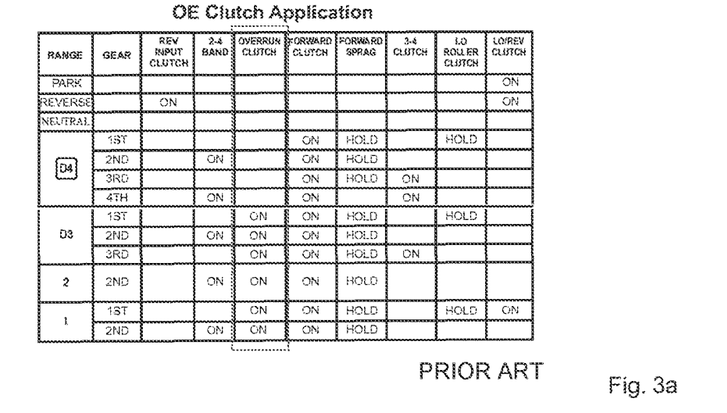
Figure 3B:
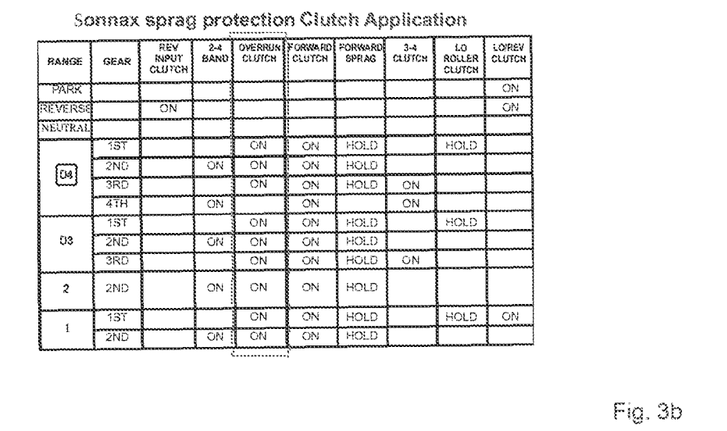
FIG. 3b illustrates the transmission components actuated or in use in various transmission gears in an embodiment of a present modification to the hydraulic circuit.

Referring to the application charts in FIG. 3, there are shown the transmission 10 components actuated or in use in various transmission gears, and specifically, clutch 26, 28 application for both the OEM (FIG. 3a) and an embodiment of the present modified hydraulic circuit for sprag protection 58 (FIG. 3b). In the OEM transmission, the overrun clutch is on or applied in the D3 position 1st, 2nd, and 3rd gears, but is not applied in the D4 position. When engine horsepower and torque are increased, this results in increased stresses on the forward sprag, which can result in failure of the forward sprag.

To alleviate this problem, referring to FIG. 3b, the load is taken off of the forward sprag 12 by applying the overrun clutch 26 in the D4 position so that the forward sprag 12 is applied but is ineffective as both the forward and overrun clutch hubs 14, 18 are locked together by their respective clutches 26, 28.

Figure 4:
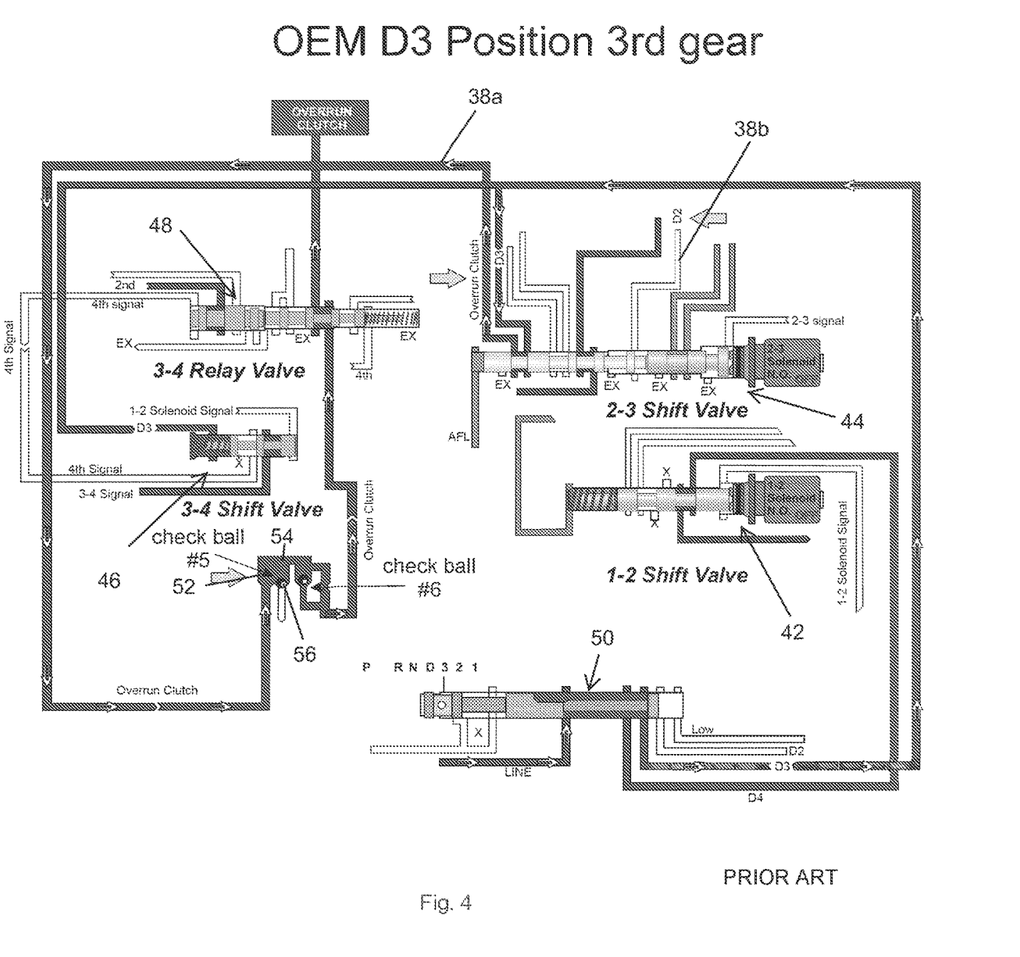
FIG. 4 is a schematic illustration of a portion of an original equipment manufacturer (OEM) vehicle transmission hydraulic circuit with the transmission in 3rd gear (D3)

FIG. 4 shows a partial circuit diagram of an OE 4L60E in the D3 manual position or 3rd gear, with the overrun clutch applied.

Figure 5:
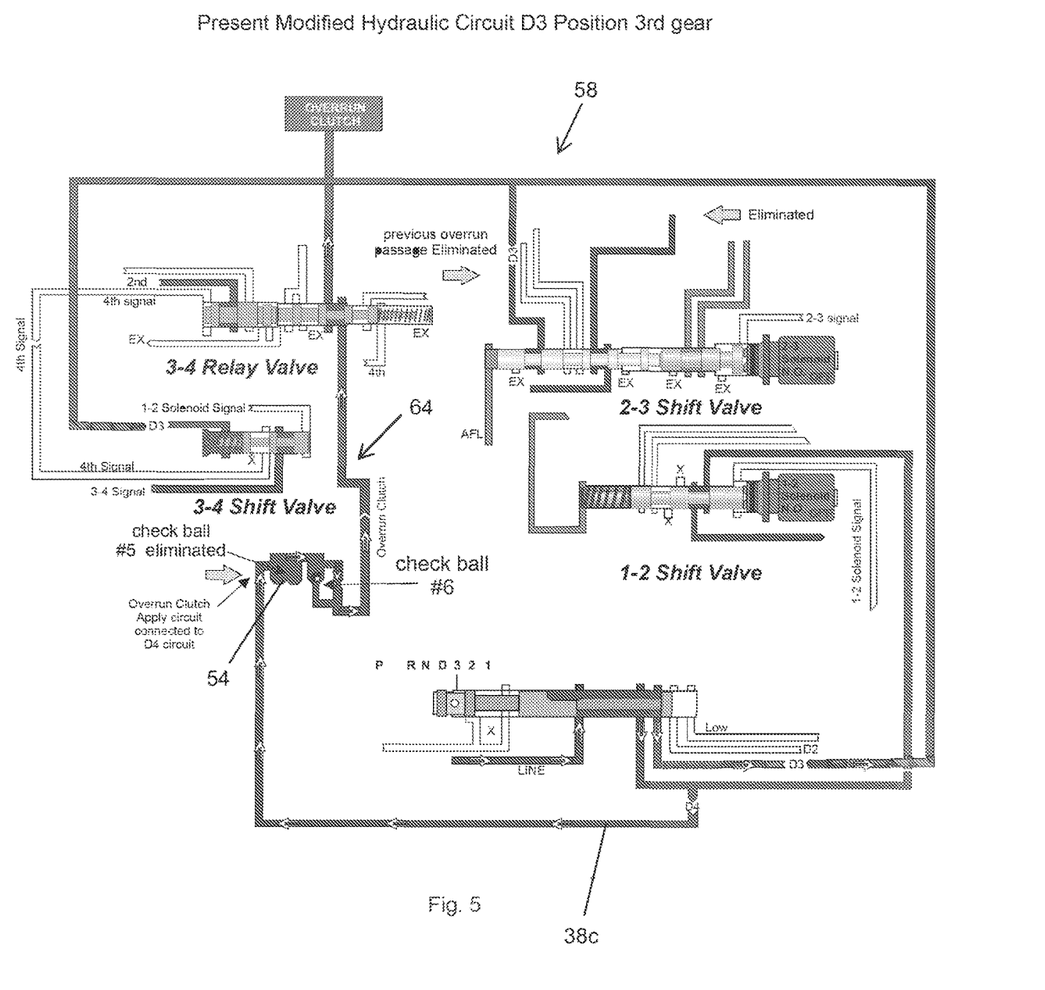
FIG. 5 is a schematic illustration of a portion of a vehicle transmission hydraulic circuit in accordance with a present modification to the hydraulic circuit with the transmission in D3.

FIG. 5 shows an embodiment of the present modified hydraulic circuit with sprag protection 58 in the D3 manual position, 3rd gear, with the overrun clutch 26 applied (for easy comparison to the OEM). The movable element 56, for example, the #5 check ball (referring to FIG. 4) has been eliminated and still referring to FIG. 4, the overrun connection at the 2-3 shift valve (passage 38b) as well as the D2 passage have also been eliminated. The overrun connection at the 2-3 shift valve and the D2 passage can be eliminated by, for example plugs 60 in the separator plate 40, plugs 60 in the valve body 36 or a replacement separator plate 40 in which the plate 40 is devoid of openings at locations that otherwise fluidically connect the 2-3 shift valve to the overrun clutch and fluidically connect the gear shift valve to the 2-3 shift valve.

Figure 6:
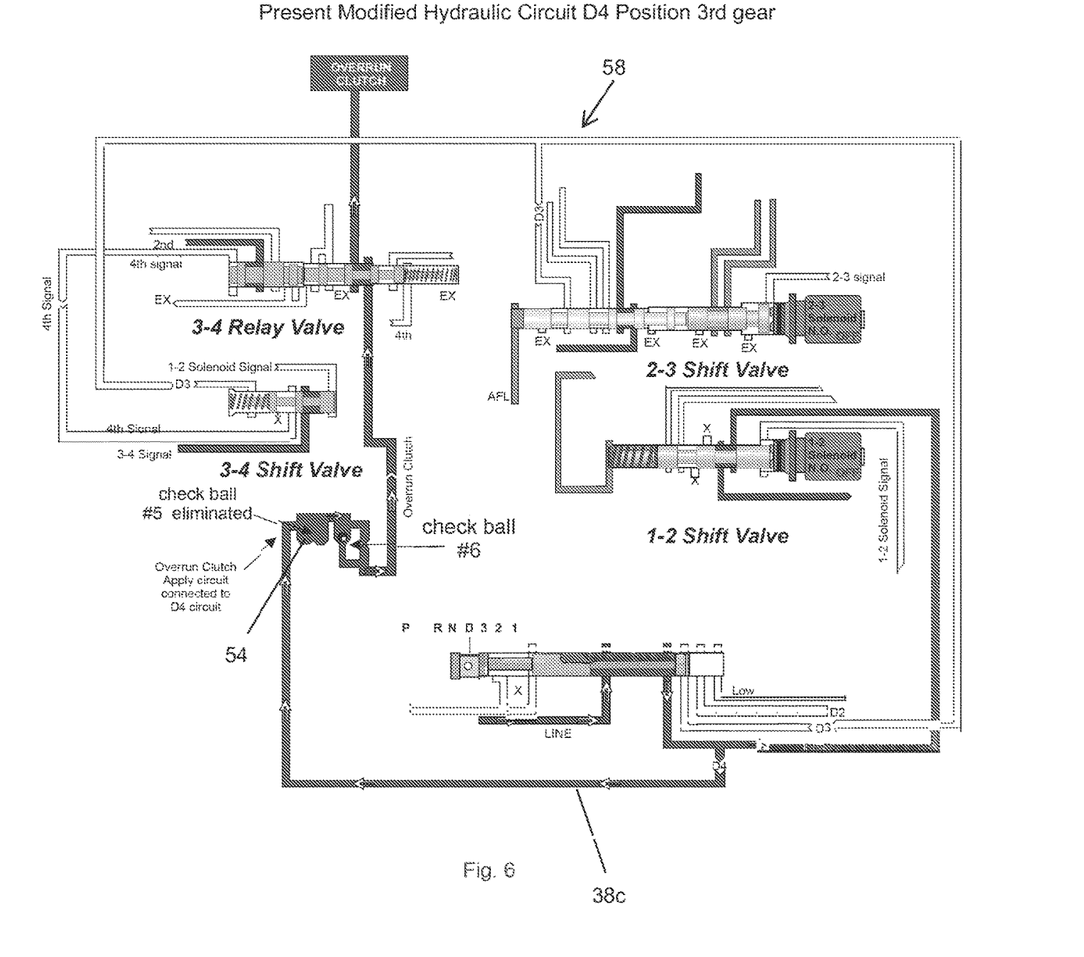
FIG. 6 is a schematic illustration of a portion of a vehicle transmission hydraulic circuit with a present modification to the hydraulic circuit with the transmission in D4.
Figure 10:
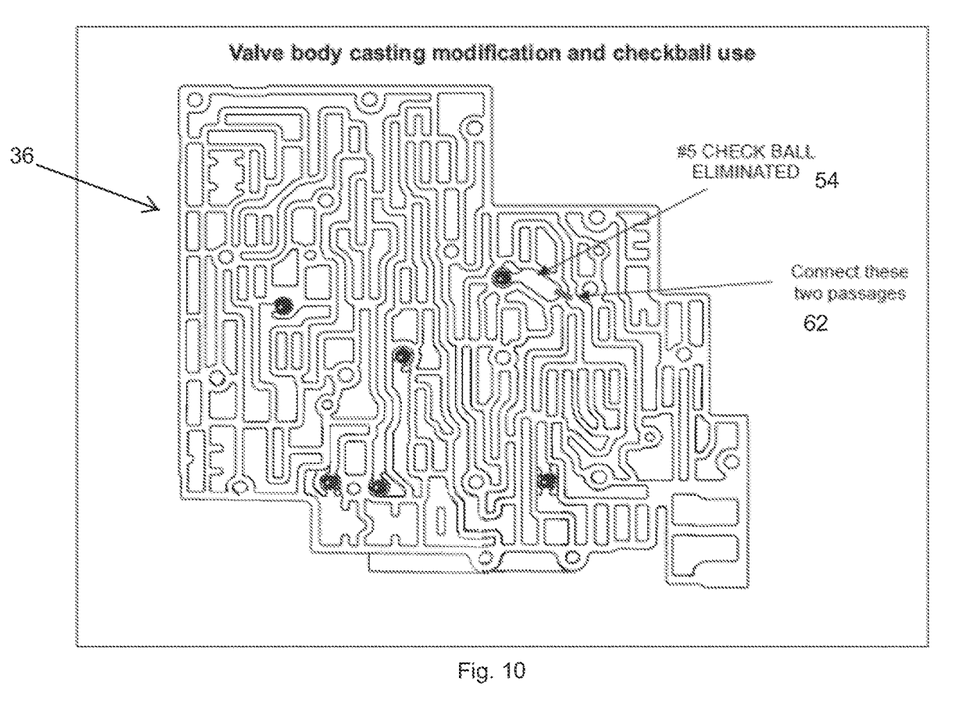
FIG. 10 is a schematic illustration of a valve body casting modification and check ball use accordance with an embodiment.

FIG. 6 shows a partial circuit diagram of the present modified hydraulic circuit with sprag 58 protection in the D4 position, in 3rd gear. This shows the connection 38*c* to the D4 hydraulic (oil) circuit which provides hydraulic pressure to the overrun clutch 26 in the D4 range. This connection 38*c* is also shown in FIG. 5, which shows the present modified hydraulic circuit with sprag 58 protection in the D3 manual position, 3rd gear, with the overrun clutch 26 applied. This connection 38*c* can be formed by forming an opening or passage 62 in the valve body, such as by drilling an opening in the valve body 36 (see, e.g., FIG. 10, indicating the location of the opening 62 formed in the valve body 36).

Figure 7:
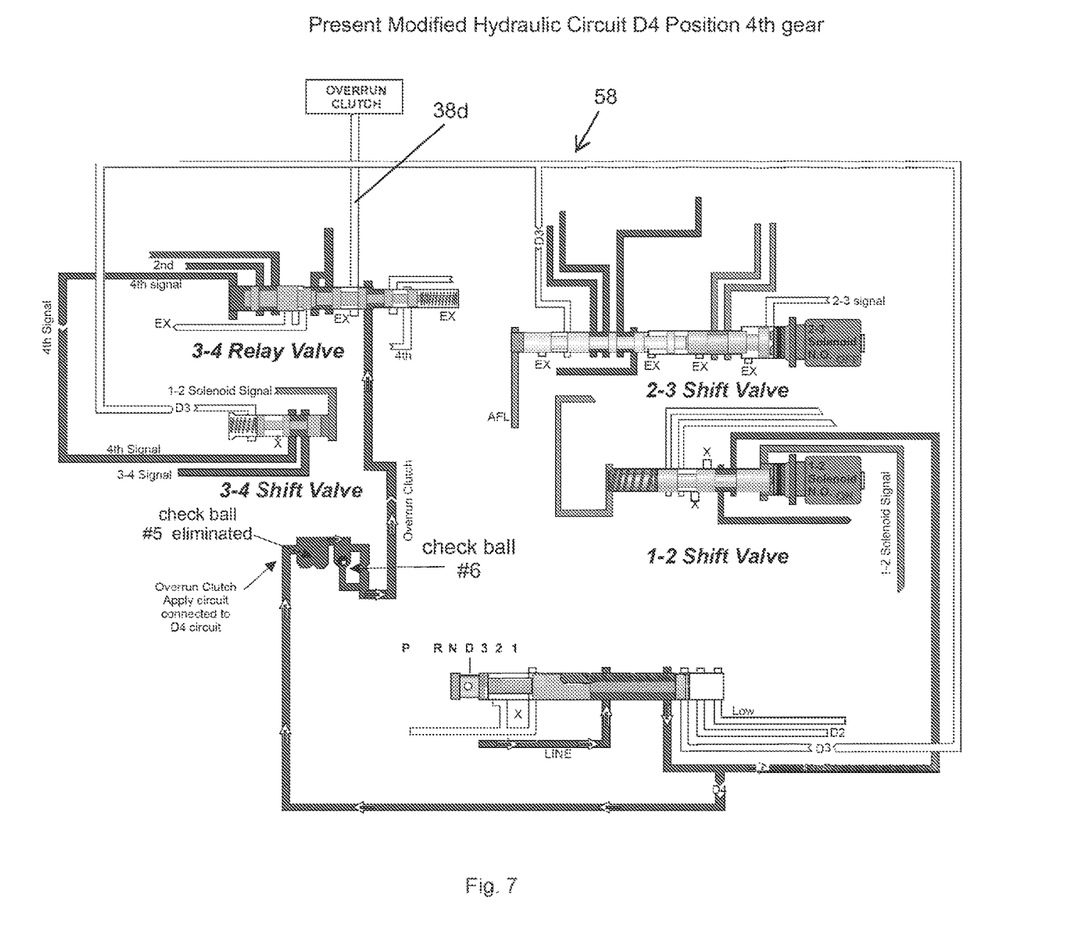
FIG. 7 is a schematic illustration of a portion of a vehicle transmission hydraulic circuit with a present modification to the hydraulic circuit with the transmission in $4^{th}$ gear (D4)

FIG. 7 shows a partial circuit diagram of the present modified hydraulic circuit with sprag protection 58 in the D4 position, in 4th gear. It should be noted that when the 3-4 shift valve 46 and 3-4 relay valve 48 stroke, hydraulic pressure to the overrun clutch 26 is drained at the 3-4 relay valve 48 (at passage 38*d*) and feed to the overrun clutch 26 is blocked by the 3-4 relay valve 48.

In order to carry out an embodiment of the present modified hydraulic circuit with sprag protection 58, parts of the OEM transmission hydraulic circuit are modified. In an embodiment, the separator plate 40 is modified to re-route the overrun clutch apply circuit (indicated generally at 64). This can be accomplished by, for example, removing or moving some of the oil circuits. In an embodiment, the #5 check ball 56 can be eliminated and the valve body 54 casting can be drilled to connect the D4 circuit 64 to the overrun clutch circuit as at the opening or passage 62.

Figure 8:
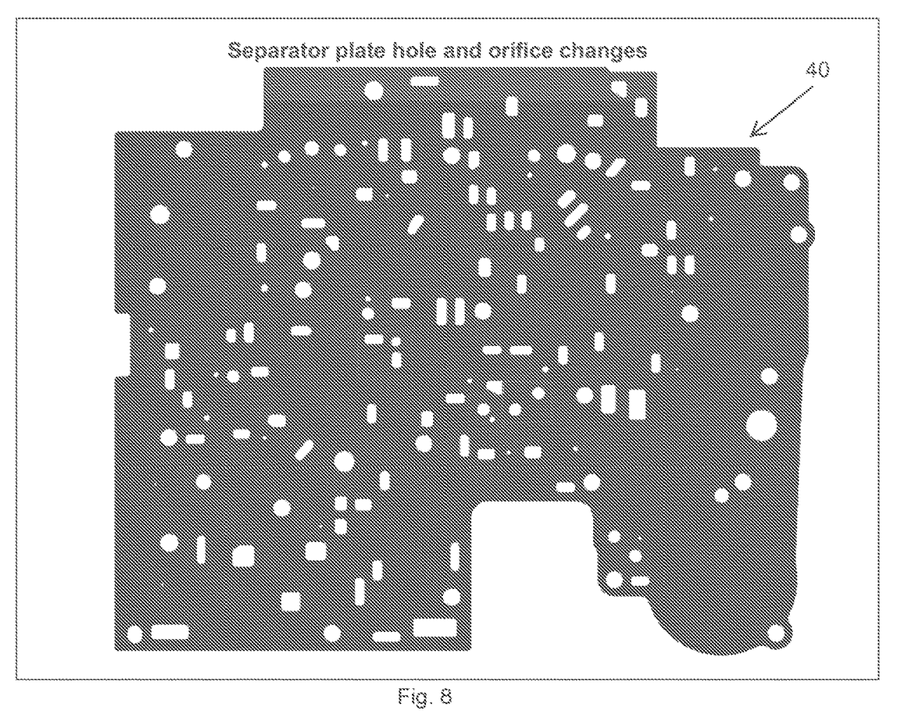
FIG. 8 is a plan view of a separator plate modified in accordance with an embodiment showing the hole and orifice changes.
Figure 9:
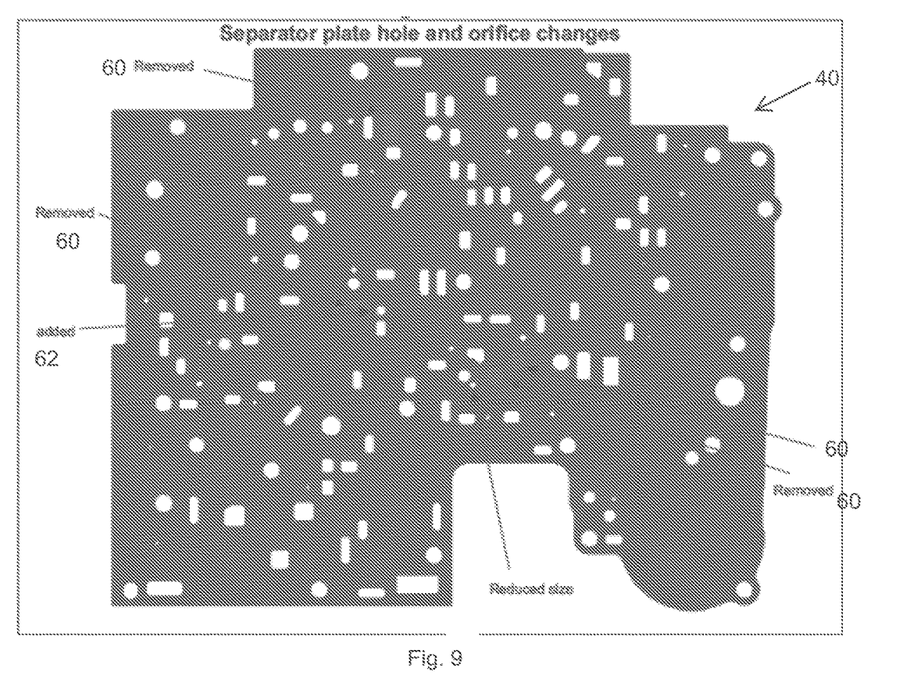
FIG. 9 is a plan view of a separator plate modified in accordance with an embodiment showing the hole and orifice changes, and identifying the changes.

FIG. 8 illustrates one example of the locations of the separator plate passages 38*a*-*d* that can be modified. FIG. 9 is an illustration of one example of the location of the circuit that can be drilled to connect the D4 circuit as at 62.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

What is claimed is:

1. A modified hydraulic circuit for an OEM vehicle transmission,
the transmission having a forward clutch, a forward clutch hub and a forward sprag having an inner sprag race and an outer sprag race, an overrun clutch and an overrun clutch hub, the forward clutch and the forward sprag providing a link to a planetary gear train to propel the vehicle forward, the forward clutch hub defining the outer sprag race, the overrun clutch hub defining the inner sprag race,
the OEM vehicle transmission, when operating in a D4 mode, applying the forward clutch but not applying the overrun clutch,
the OEM vehicle transmission further including a hydraulic valve body having a plurality of passages and a separator plate, and further including a 1-2 shift valve, a 2-3 shift valve, a 3-4 shift valve and a 3-4 relay valve, and a gear shift valve,
one of the plurality of passages fluidically connecting the 2-3 shift valve to the overrun clutch via a first check valve, the first check valve having a body and a movable element ball,
another of the plurality of passages fluidically connecting the gear shift valve to the 2-3 shift valve,
the modified hydraulic circuit comprising:
a first blockage in the passage fluidically connecting the 2-3 shift valve to the overrun clutch;
a second blockage in the passage fluidically connecting the gear shift valve to the 2-3 shift valve;
removal of the movable element ball from the first check valve body; and
a passage from the gear shift valve to the overrun clutch via the first check valve body,
wherein when operating in the D4 mode, the forward clutch is applied and the overrun clutch is applied and are locked to one another, such that the forward sprag is ineffective.

2. The modified hydraulic circuit of claim 1, wherein the first blockage is a plug in the separator plate.

3. The modified hydraulic circuit of claim 1, wherein the second blockage is a plug in the separator plate.

4. The modified hydraulic circuit of claim 1, wherein the first blockage is a plug in the valve body.

5. The modified hydraulic circuit of claim 1, wherein the second blockage is a plug in the valve body.

6. The modified hydraulic circuit of claim 1, wherein the movable element ball is a check valve ball.

7. The modified hydraulic circuit of claim 1, further including a replacement separator plate, and wherein the first and second blockages are formed by a replacement separator plate void of openings at locations that otherwise fluidically connect the 2-3 shift valve to the overrun clutch and fluidically connect the gear shift valve to the 2-3 shift valve.

8. The modified hydraulic circuit of claim 1, wherein the passage from the gear shift valve to the first check valve body is an opening in the valve body.

9. A method of modifying hydraulic circuit for an OEM vehicle transmission,
the transmission having a forward clutch, a forward clutch hub and a forward sprag having an inner sprag race and an outer sprag race, an overrun clutch and an overrun clutch hub, the forward clutch and the forward sprag providing a link to a planetary gear train to propel the vehicle forward, the forward clutch hub defining the outer sprag race, the overrun clutch hub defining the inner sprag race,
the OEM vehicle transmission, when operating in a D4 mode, applying the forward clutch but not applying the overrun clutch,
the OEM vehicle transmission further including a hydraulic valve body having a plurality of passages and a separator plate, and further including a 1-2 shift valve, a 2-3 shift valve, a 3-4 shift valve and a 3-4 relay valve, and a gear shift valve,
one of the plurality of passages fluidically connecting the 2-3 shift valve to the overrun clutch via a first check valve, the first check valve having a body and a movable element ball,
another of the plurality of passages fluidically connecting the gear shift valve to the 2-3 shift valve,
the method comprising:

blocking the passage fluidically connecting the 2-3 shift valve to the overrun clutch;
blocking the passage fluidically connecting the gear shift valve to the 2-3 shift valve;
removing the movable element ball from the first check valve body; and
forming a passage from the gear shift valve to the overrun clutch via the first check valve body,
wherein when operating in the D4 mode, the forward clutch is applied and the overrun clutch is applied and are locked to one another, such that the forward sprag is ineffective.

10. The method of claim 9, wherein blocking the passage fluidically connecting the 2-3 shift valve to the overrun clutch is installing a plug in the separator plate.

11. The method of claim 9, wherein blocking the passage fluidically connecting the gear shift valve to the 2-3 shift valve is installing a plug in the separator plate.

12. The method of claim 9, wherein blocking the passage fluidically connecting the 2-3 shift valve to the overrun clutch is installing a plug in the valve body.

13. The method of claim 9, wherein blocking the passage fluidically connecting the gear shift valve to the 2-3 shift valve is installing a plug in the valve body.

14. The method of claim 9, further including installing a replacement separator plate, wherein the blocking of the passages is provided by a replacement separator plate void of openings at locations that otherwise fluidically connect the 2-3 shift valve to the overrun clutch and fluidically connect the gear shift valve to the 2-3 shift valve.

15. The method of claim 9, wherein forming the passage from the gear shift valve to the first check valve body is forming an opening in the valve body.

* * * * *